No. 799,315. PATENTED SEPT. 12, 1905.
R. J. EDWARDS.
TRUCK.
APPLICATION FILED DEC. 13, 1904.
3 SHEETS—SHEET 1.
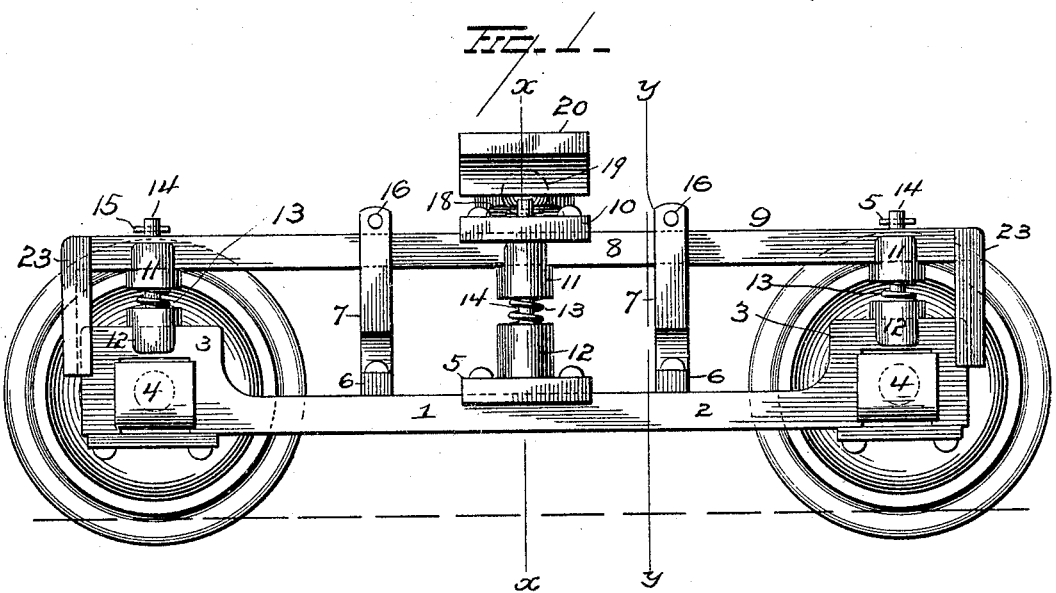
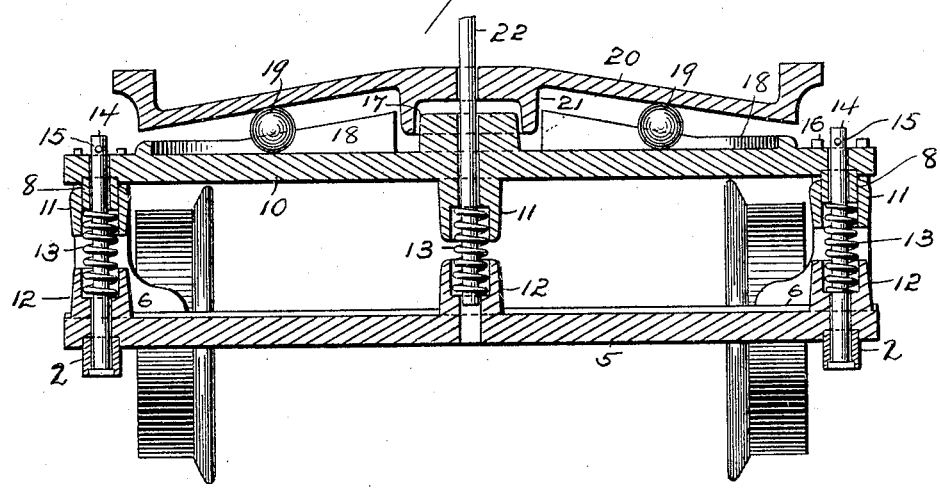
WITNESSES
E. J. Nottingham
G. F. Downing
INVENTOR
R. J. Edwards
By H. G. Seymour
Attorney No. 799,315. PATENTED SEPT. 12, 1905.
R. J. EDWARDS.
TRUCK.
APPLICATION FILED DEC. 13, 1904.
3 SHEETS—SHEET 2.
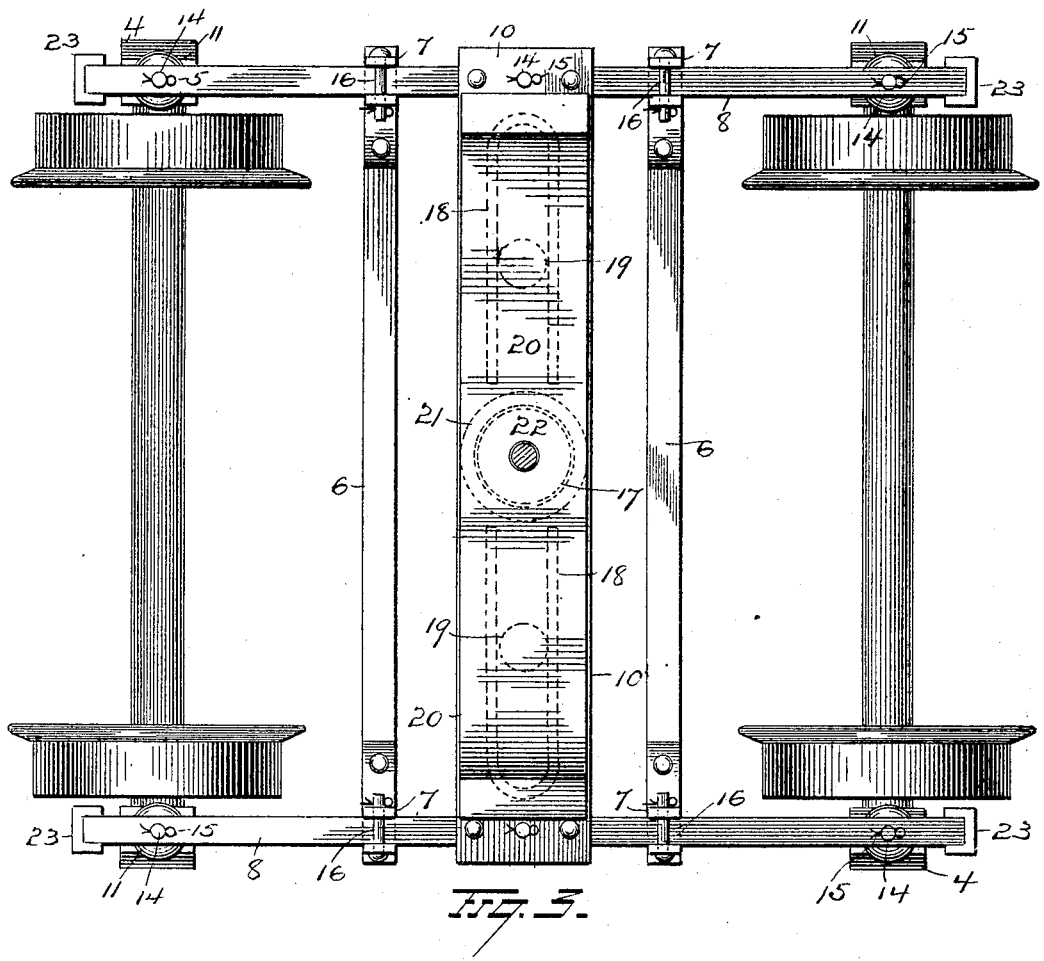
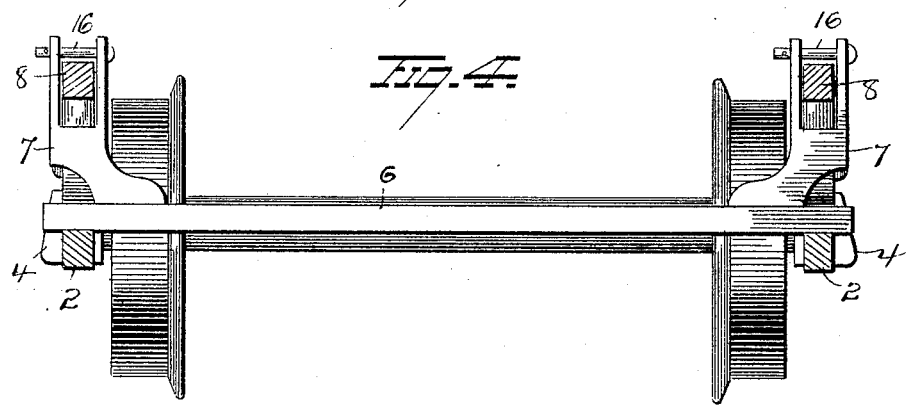

No. 799,315. PATENTED SEPT. 12, 1905.
R. J. EDWARDS.
TRUCK.
APPLICATION FILED DEC. 13, 1904.
3 SHEETS—SHEET 3.
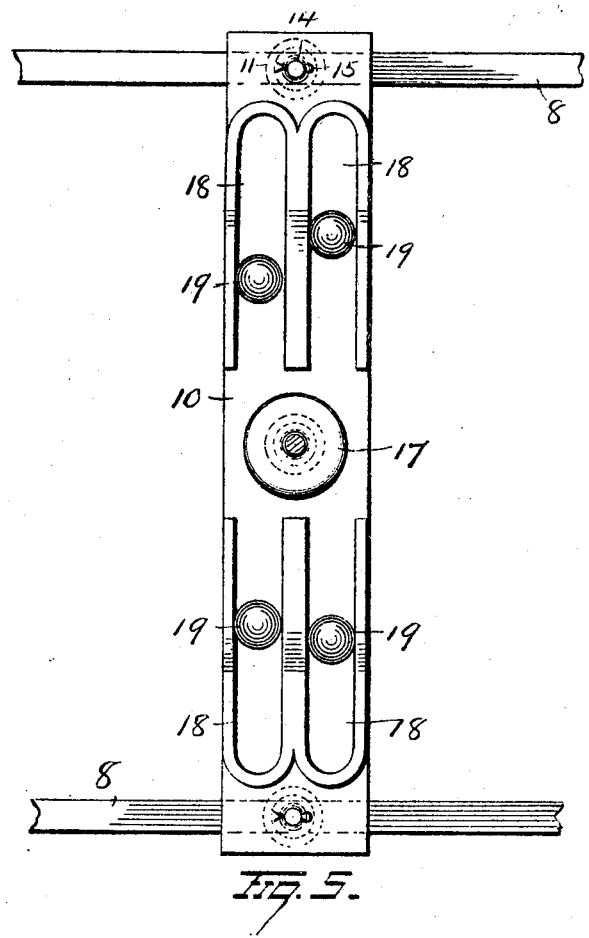
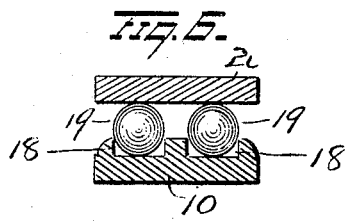
WITNESSES
INVENTOR

UNITED STATES PATENT OFFICE.

RICHARD JAS. EDWARDS, OF GALENA, ILLINOIS.

TRUCK.

No. 799,315.     Specification of Letters Patent.     Patented Sept. 12, 1905.

Application filed December 13, 1904. Serial No. 236,690.

*To all whom it may concern:*

Be it known that I, RICHARD JAS. EDWARDS, a resident of Galena, in the county of Jo Daviess and State of Illinois, have invented certain new and useful Improvements in Trucks; and I do hereby declare the following to be a full, clear, and exact description of the invention, such as will enable others skilled in the art to which it appertains to make and use the same.

My invention relates to an improvement in car-trucks, the object of the invention being to provide improvements which will greatly reduce sidewise vibration of the car-body, and this improved result is accomplished by an improved construction of truck and movable balls or rollers, which stop tilting movement of the car-body.

A further object is to provide an improved truck comprising upper and lower frames which can be readily separated and assembled and provide equalizing-springs between the sides and center of these frames.

With these and other objects in view the invention consists in certain novel features of construction and combinations and arrangements of parts, as will be more fully hereinafter described, and pointed out in the claims.

In the accompanying drawings, Figure 1 is a view in side elevation illustrating my improvements. Fig. 2 is a view in section on the line *x x* of Fig. 1. Fig. 3 is a top plan view. Fig. 4 is a view in section on the line *y y* of Fig. 1, and Figs. 5 and 6 are views of a modification.

1 represents a lower truck-frame, comprising parallel longitudinal side bars 2, having yokes or openings 3 at their ends to receive and rest on the journal-boxes 4, and said bars 2 are connected centrally by a wide spring-bar 5, and at each side of bar 5 the bars 2 are connected by narrow bars 6. On the bars 6, near their ends and constituting a part of frame 1, bifurcated or forked brackets 7 are located and receive the longitudinal side bars 8 of upper frame 9, and said bars 8 are connected centrally by the truck-bolster 10. The bars 8 of frame 9 at their center and near their ends have depending cups 11, located above similar cups 12 on the spring-bar 5 and on the yoke ends of bars 2, and coiled springs 13 of like strength are located in all of said alined cups, and the truck-bolster 10 and spring-bar 5 are provided at their center with similar cups 11 and 12 to receive a spring 13 of similar strength to the springs 13 in the other cups.

It will be observed that the springs at the ends of the frames are located directly above the journal-boxes, and the weight is carried and exerted directly on the journals. By providing three springs at each side and one at the center, all of equal strength, the strain is perfectly equalized, and lateral swinging of the car-body is reduced to a minimum.

Bolts or rods 14, having heads at their lower ends, are passed up through all of the cups and springs at the sides of the truck, and cotter-pins 15 are passed through the upper ends of the bolts or rods 14, and cross-pins 16 are passed through the forked guide-brackets 7 and secured by cotter-pins, and it will be seen that by removing all of these pins the upper frame can be readily lifted off the lower frame. The forked brackets 7 and grooved bars 23 at the ends of bars 8, which move against the ends of bars 2, serve to hold the frames in true operative position with relation to each other at all times.

Longitudinally of the truck-bolster 10 and on top thereof at opposite sides of its center-bearing 17 guides or runways 18 are provided for balls or rollers 19, and, as shown in Figs. 5 and 6, two or more of these runways may be provided at each side. The body-bolster 20 has its center-bearing 21 mounted to turn on the center-bearing 17 of truck-bolster and is secured by the king-pin 22. The body-bolster 20 inclines downward at each side, and the balls or rollers 19 serve as movable side bearings therefor. For instance, when the car is rounding an inclined curve or for any other reason the track is inclined the balls will roll in one direction on the truck-bolster 10 and as the body-bolster 20 starts to tilt will engage the ball or balls and be held with the body in a comparatively normal position, and hence the balls will compensate for the varying positions of the truck and prevent the body tilting with the truck. When the truck tilts in the reverse direction, the balls will roll the other way and be always in position to support the car in its normal straight or vertical position.

Instead of employing cotter-pins 15 the ends of rods 14 may be screw-threaded and nuts employed thereon.

It will thus be seen that the balls or rollers compensate for varying positions of the truck and prevent undue tilting of the car-body, which is most disagreeable to passengers and a great strain on one side of the truck, whereas with my improvements the strain is equally distributed throughout the truck at all times.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a truck, the combination with a lower frame, of an upper frame, springs at the sides and one at the center of said frames, all of equal strength, separating said frames and elastically supporting the upper frame, and means removably securing the upper frame in such position.

2. In a truck, the combination with a lower frame supported directly on the journal-boxes, of an upper frame, bolts passed through alined openings in the frames, cotter-pins in the upper ends of the bolts, springs around the bolts between the frames, and guide-brackets on the lower frame constructed to guide the movements of the upper frame.

3. In a truck, the combination with a lower frame, of an upper frame, vertical rods or bolts passed through openings in the sides of the frames, heads on the lower ends of the rods or bolts, cotter-pins passed through the upper ends of the rods or bolts, springs around said rods or bolts between the frames and all of said springs of the same strength, and a spring of the same strength as the side springs, located between the upper and lower frames at their center.

4. In a truck, the combination of a lower frame comprising side bars supported on the journal-boxes, a spring-bar connecting the side bars at their center, smaller bars at opposite sides of the spring-bar, forked brackets on said last-mentioned bars, an upper frame comprising side bars located in the forked brackets, a bolster connecting the side bars, and springs of equal strength located between the frames at their sides and center.

5. In a truck, the combination of a lower frame comprising side bars supported on the journal-boxes, a spring-bar connecting the side bars at their center, smaller bars at opposite sides of the spring-bar, forked brackets secured on said smaller bars, an upper frame having side bars guided in the forked brackets, a bolster connecting the side bars of the upper frame at their center, grooved bars at the ends of the side bars of the upper frame movable on the ends of the side bars of the lower frame, vertical rods or bolts passed up through openings in the side bars of the upper and lower frames, springs of equal strength around said bolts between the frames, cotter-pins passed through the upper ends of the bolts or rods, and a spring of the same strength as the side springs, located between the center of the bolster and spring-bar.

In testimony whereof I have signed this specification in the presence of two subscribing witnesses.

RICHARD JAS. EDWARDS.

Witnesses:
JOHN J. JONES,
CHARLES A. DAVIS.